March 7, 1944. G. COON 2,343,444
LOADER FOR BALED MATERIAL
Filed Sept. 18, 1942 2 Sheets-Sheet 1
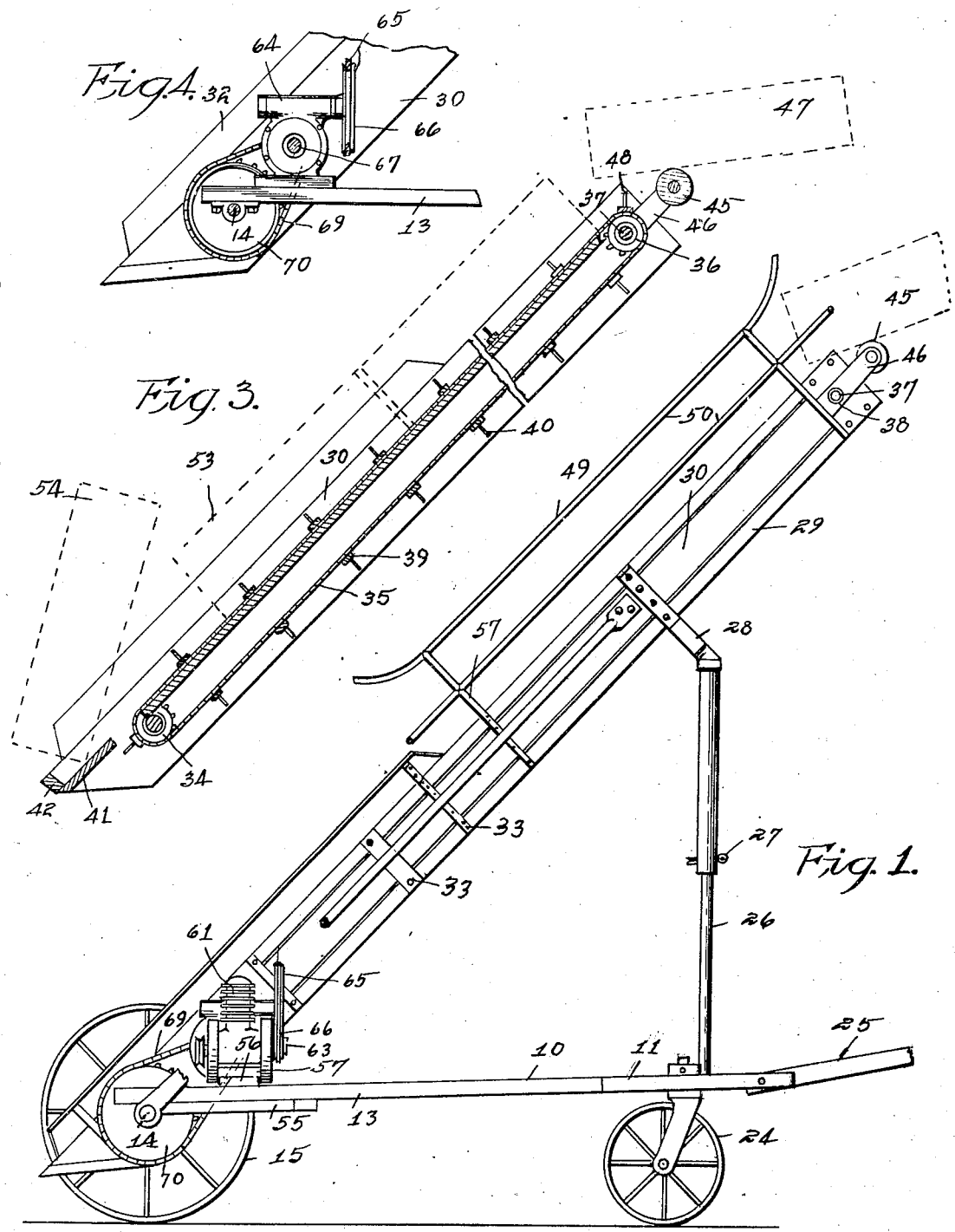
Inventor
Guy Coon
by Orwig & Hague
attys March 7, 1944.  G. COON  2,343,444
LOADER FOR BALED MATERIAL
Filed Sept. 18, 1942  2 Sheets-Sheet 2
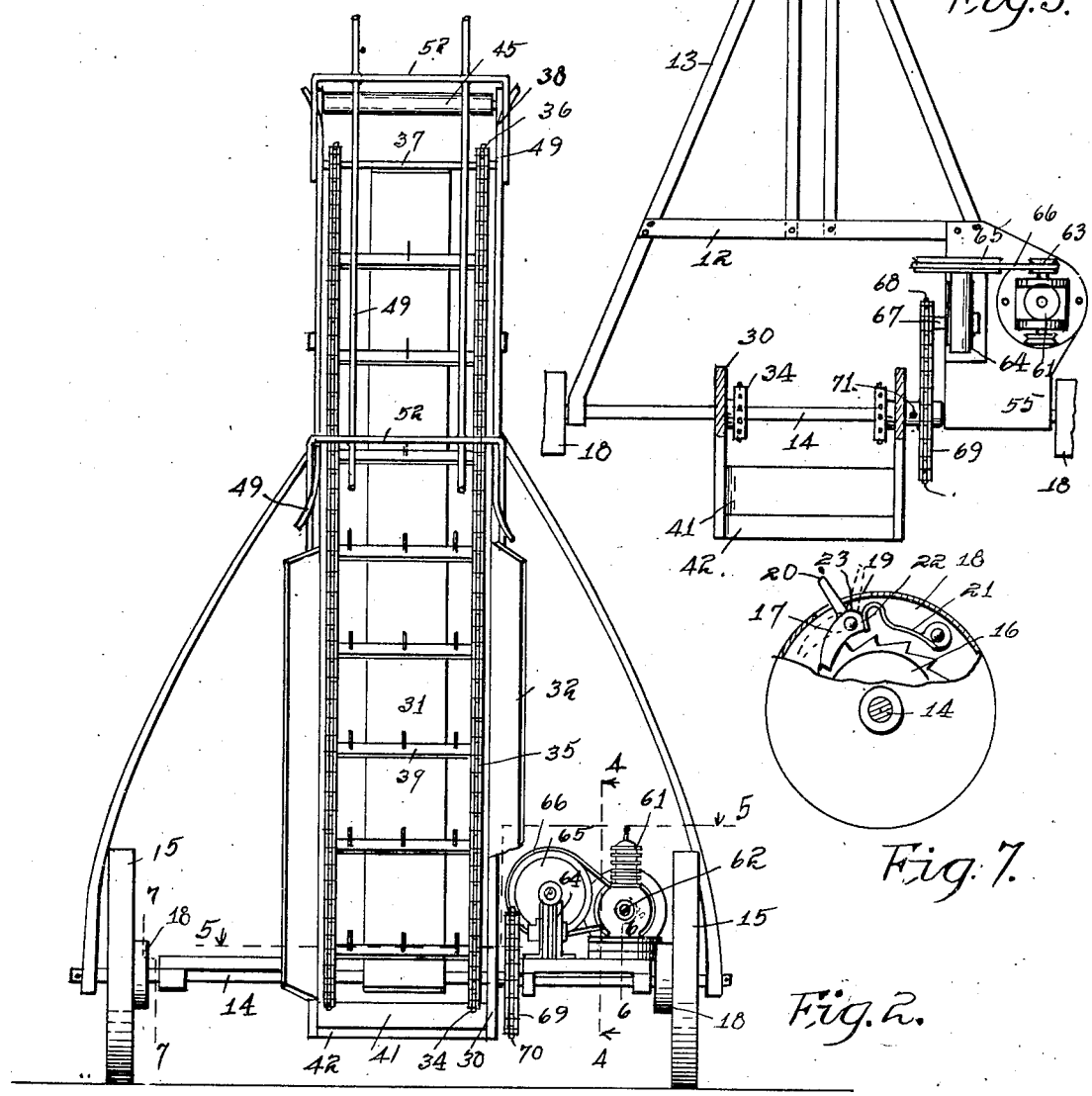

Patented Mar. 7, 1944

2,343,444

UNITED STATES PATENT OFFICE 2,343,444

LOADER FOR BALED MATERIAL

Guy Coon, Hartford, Iowa

Application September 18, 1942, Serial No. 458,759

5 Claims. (Cl. 198—233)

This invention relates to a machine for loading baled material such as hay, straw or other materials, being particularly adapted to be used in connection with the loading of baled material which has been delivered by the portable baler now in quite common use. These balers are so constructed and arranged that when operated in connection with a suitable means for gathering the material from windrows and feeding it to the baler, the material will be baled and delivered to the ground surface in a more or less promiscuous manner. Suitable wagons or trucks are then conveyed through the field wherein the bales are gathered and loaded on the said vehicles. Inasmuch as each bale weighs from 75 to 100 lbs., it requires a considerable amount of energy on the part of the person gathering the bales, to lift them and load them on the vehicle at positions from four to twelve feet in elevation.

It is, therefore, the object of my invention to provide a portable loader adapted to be hitched to and drawn by the vehicle to position opposite the bale to be loaded, wherein the bale may be loaded on a suitable receiving platform near the ground surface, and when so loaded, tilted to position on a suitable conveyor which is operated by advancing the loader over the ground surface to elevate the bale to a point at such elevation where it may be easily grasped by a person on the vehicle for placing the bale in the desired position thereon.

More specifically, it is the object of my invention to provide a frame employing a caster wheel at its front end for supporting the same, and traction wheels at the rear end of the frame for supporting the rear end, and at the same time providing traction for operating an elevator inclined upwardly and forwardly from the ground surface and a receiving platform near the ground surface for receiving one end of a bale in such a manner that the bale may be tilted into operative position on the conveyor, wherein the bale will be moved upwardly and forwardly and delivered to the rear end of the vehicle to which the loader is attached, by power derived from the advance of the loader over the ground surface.

A further object is to provide in connection with a loader of the type described, a roller at the delivery end of the conveyor to cause the spikes on the conveyor to be more readily disengaged from the bale and at the same time support the bale out of contact with the spikes as they pass around the upper end of the conveyor.

A further object of my invention is to provide in a loader of the type above described, means whereby power derived from a prime mover may be utilized to operate the conveyor at such times as the loader is located in a stationary position, wherein the said loader may be utilized for conveying bales from the loaded vehicle to a barn or stack.

A further object is to provide in connection with a power device of the class above described, simple and improved means whereby the operation of the conveyor may be reversed for conveying bales from the barn to the vehicle or the ground surface.

A further object is to provide in a loader of the type above described, an improved guard for preventing the bale from falling off as it is elevated.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved loader, a portion of one of the braces being broken away;

Figure 2 is a rear end view of the same;

Figure 3 is a vertical longitudinal sectional view of the conveyor and of the loading platform;

Figure 4 is a detail sectional view of a portion of the power mechanism taken on the line 4—4 of Figure 2;

Figure 5 is a detail sectional view taken on the line 5—5 of Figure 2 illustrating the portable frame in top elevation;

Figure 6 is an enlarged detail sectional view taken on the line 6—6 of Figure 2 illustrating the manner in which the power unit is pivotally mounted for reversing the movement of the elevator conveyor; and Figure 7 is a detail sectional view taken on the line 7—7 of Figure 2.

My improved loader comprises what I shall term a portable frame 10 formed of parallel beams 11 spaced apart a slight distance, having at their rear ends a cross beam 12, said beam 12 supporting at its ends inclined beams 13, having their forward ends connected to the members 11 and opposite a spacing block 12a. A drive shaft 14 is rotatably mounted in the rear ends of the members 13 and provided at each end with a traction wheel 15. The shaft 14 and the wheels 15 are operatively connected by means of a ratchet wheel 16 and a pawl 17, the said ratchet wheel being fixed to said shaft. The spring-actuated pawl 17 is carried by a drum 18 forming a part of the hub of the wheel 15, the periphery of the said drum 18 having a slot 19 through which a lever 20 is projected from the pawl 17, and provides means for causing the pawl to engage or disengage the said ratchet by manual manipulation. The spring 21 is designed to yieldably retain the pawl in contact with the ratchet teeth by engaging a cam surface 22 formed on said pawl, or to be yieldably held out of contact with said ratchet teeth when said spring engages a cam surface 23 carried by said pawl, thus providing means whereby the said shaft 14 may be operatively or inoperatively connected with the wheels 15. The forward end of the portable frame is carried by a caster wheel 24.

Pivotally supported between the forward ends of the members 11 is a hitch bar 25 which may be attached to the vehicle on which the bales are loaded, in any desired manner.

The forward end of the portable frame 10 is provided with an upright telescopic post 26 which is adjustable by means of a pin 27 as to length. The upper end of the post 26 is provided with a bracket 28 for supporting the upper end of an elevator 29 having its lower end supported by the central portion of the shaft 14 and the frame member 10.

The said elevator comprises side members 30 and a bottom member 31, and flaring flanges 32 carried by the lower end of the members 30. Suitable brace bars 33 are provided for reenforcing the side members 30 and 32. The shaft 14 is provided with sprockets 34 for supporting an endless conveyor 35, the upper end of said conveyor being mounted on sprockets 36 carried by a shaft 37, said shaft being mounted in a suitable bearing 38 supported by the upper ends of the side members 30. The conveyor 31 is provided with cross slats 39 having spikes 40 for engaging the under surfaces of the bales. A platform 41 is mounted between the lower ends of the members 30 in substantially the same plane as the bottom 31, having at its lower end a block 42 so as to form a shallow trough 43 for receiving one corner of a bale 54, illustrated in dotted lines. By this arrangement it will be seen that as the shaft 14 is rotated, the sprockets 34 will be rotated in a clockwise direction, as illustrated in Figure 3, causing the conveyor 35 to be operated and the bale placed thereon elevated and delivered over the upper end thereof.

In order to assist in having the spikes 40 disengage the under surfaces of the bale as the spikes travel over the sprockets 36, I have provided a roller 45 supported in lugs 46 carried by the bearing members 38, said roller 45 being so arranged that as the bale 47, illustrated in dotted lines, has passed over the said roller, the said roller serves as a fulcrum, wherein the forward end of the bale 47 over-balances its rear end and causes the said rear end to disengage the spikes 48.

In order to prevent the bales from being accidentally blown off the upper end of the conveyor by strong winds, or from being slid off on account of the device operating on side hills, I have provided a shield 49 formed of longitudinal rods 50, vertical rods 51 and horizontal rods 52, the lower ends of the vertical rods 51 being secured to the side members 30. The ends of the rods 50 are curved outwardly, as clearly illustrated, to prevent the ends of the rods from gouging into the bale as it is moved through the shield 49. By this arrangement it will be seen that if the hitch 25 is connected to the rear end of a wagon or truck having a suitable rack, that the upper delivery end of the elevator 29 will be supported above the rear end of said rack and that the truck or wagon will be conveyed to a point with the platform 41 of the elevator close to a bale to be loaded, after which one end of a bale 54 may be placed on said platform and the opposite end grasped and swung to the position shown in dotted lines in Figure 3. If a bale 53 has been previously placed on the conveyor 35 and assumes the position illustrated in Figure 3, then the upper end of the bale 54 may be held in said dotted line position until the machine is advanced over the ground surface and the bale 53 has been elevated such distance as to permit the bale 54 to be lowered in operative position. The platform 41 serves to carry the lower end of a bale as the loader is advanced until it is in operative position on the conveyor. If the bales are bunched or closely grouped so that there is not sufficient space between the bales, as they are successively loaded on the conveyor, to enable the conveyor to travel far enough to give the desired clearance, then it is necessary that power from a prime mover, such as a gasoline engine or an electric motor, be provided for operating the conveyor while the device is standing still, or at such times as when the elevator is stationed in front of a barn for loading the bales from the wagon to the barn. In order to accomplish this I have provided on the portable frame 10 a platform 55 on which is supported a base member 56 having pivotally supported thereon a plate 57 by means of a pivot member 58, the base 56 having openings 59 for receiving a pin 60 carried by the plate 57 for locking the said plate 57 in either one of two positions at an angular distance of 180°.

Supported on the plate 57 is a prime mover 61 which may either be a gasoline engine or an electric motor, a gasoline engine being herewith illustrated having a drive shaft 62. Each end of the shaft is provided with a pulley wheel 63. Also supported on the platform is a speed reducing device 64 having a belt wheel 65 supporting a belt 66 which is also mounted on one of the pulleys 63. A shaft 67 projects from one side of the speed reducer 64 and is driven thereby at a reduced speed and is provided with a sprocket pinion 68 adapted to support a sprocket chain 69 carried on a sprocket wheel 70 which is carried by and fixed to the shaft 14. By this arrangement it will be seen that if the shaft 63 is rotated, the belt 66 and the chain 69 will also be operated by the mechanism above described, which also will cause the shaft 14 to be rotated, and with it the conveyor 35. At such times as when the said power mechanism is operated, the pawls 17 are caused to disengage the ratchets 16. At such times as when the elevator is operated by advancing the loader over the ground surface, the sprocket 70 may be disengaged from the shaft 14 by simply removing the pin 71 which connects said sprocket to said shaft. Any other suitable hand actuated clutch may be provided for this purpose. This prevents the necessity of operating the power mechanism at the time the traction wheels are used for power.

Thus, it will be seen I have provided a loader which is adapted to be hitched or attached to the wagon or truck for hauling the bales to the barn or stack, and when so attached provides means whereby the baled material may be first placed on the platform 41, after which power either derived from the advance of the loader or from the auxiliary power from the prime mover may be utilized to elevate the bales where they may be easily grasped by the operator loading the vehicle.

It will also be seen I have provided a loader which may be utilized for delivering bales from a loaded wagon to the loft of a barn wherein the hard work of lifting the bales to a considerable elevation is eliminated and wherein the barn may be either loaded or unloaded at the will of the operator.

When it is desired to deliver bales from the barn to the ground surface the operation of the conveyor may be reversed by first removing the belt 66 from the pulleys 65 and 63 and pulling the pin 69, then swinging the plate 57 through an angle of 180°, then swinging the unused pulley in operative position, and again placing the belt 66 on the pulley 65 and the last said pulley 63. This provides a simple reversing mechanism which is particularly adapted to be used in connection with prime movers of the non-reversible type.

I claim as my invention:

1. In a wheel-supported elevator frame including a conveyor drive shaft, a pawl and ratchet mechanism adapted to releasably connect the elevator wheels to said conveyor drive shaft, means for imparting power to said drive shaft independently of said ratchet mechanism comprising a prime mover carried by said frame including a power shaft having ends extending from opposite sides of said prime mover, transmission mechanism, means pivotally supporting said prime mover whereby the positions of the ends of said shaft may be reversed for selective connection with said transmission mechanism, and means for operatively connecting and disconnecting said transmission mechanism with said conveyor drive shaft.

2. In a wheel-supported elevator frame including a conveyor drive shaft, a pawl and ratchet mechanism adapted to operatively connect said wheels to said conveyor drive shaft, means for imparting power to said drive shaft independently of said ratchet mechanism, comprising a base member supported on said frame, a plate pivotally supported on said base, a prime mover mounted on said plate including a power shaft whereby the positions of the ends of said power shaft may be reversed, means for locking said plate in either of two operating positions, means for transmitting power from one end of said power shaft and from a predetermined side of said prime mover to said conveyor drive shaft, and means for operatively connecting and disconnecting said power transmitting means to said conveyor drive shaft.

3. In a wheel-supported elevator frame including a conveyor drive shaft, means for operating said drive shaft comprising a base member supported on said frame, a plate pivotally supported on said base, a prime mover fixed to and mounted on said plate including a power shaft whereby the positions of the ends of said power shaft may be reversed, means for locking said plate in either of two operating positions, means for transmitting power from one end of said power shaft to said conveyor drive shaft, and means for operatively connecting and disconnecting said power transmitting means with said conveyor drive shaft.

4. In a wheel-supported elevator frame including a conveyor drive shaft, means for operating said drive shaft comprising a sprocket wheel rotatably mounted on said conveyor drive shaft, means for operatively connecting and disconnecting said sprocket to said conveyor drive shaft, a speed reducing mechanism having driving and driven shafts, a second sprocket wheel mounted on the driven shaft of said speed reducer, a chain operatively connecting said two sprocket wheels, a first pulley mounted on the driving shaft of said speed reducer, a base member supported on said frame, a plate pivoted on said base, a prime mover mounted on said plate including a power shaft whereby the positions of the ends of said power shaft may be reversed, means for locking said plate in either of two operating positions, a pulley mounted on each end of said power shaft, and a belt for connecting said first pulley with one of the pulleys on said power shaft.

5. In a wheel-supported elevator frame including a conveyor drive shaft, means for operating said drive shaft comprising a prime mover carried by said frame including a power shaft having ends extending from opposite sides of said prime mover and operated therefrom, means pivotally supporting said prime mover whereby the positions of the ends of said shafts may be reversed, a fixed transmission and speed reducing unit for imparting power from one end of said shaft to the conveyor shaft, and means operatively connecting and disconnecting said transmission unit to and from said conveyor drive shaft.

GUY COON.